United States Patent [19]

Castiel et al.

[11] Patent Number: 5,582,367
[45] Date of Patent: Dec. 10, 1996

[54] ELLIPTICAL ORBIT SATELLITE, SYSTEM, AND DEPLOYMENT WITH CONTROLLABLE COVERAGE CHARACTERISTICS

[75] Inventors: David Castiel; John E. Draim; Jay Brosius, all of Washington, D.C.

[73] Assignee: Mobile Communications Holdings, Inc., Washington, D.C.

[21] Appl. No.: 197,260

[22] Filed: Feb. 16, 1994

Related U.S. Application Data

[63] Continuation-in-part of Ser. No. 892,239, Jun. 2, 1992.
[51] Int. Cl.[6] .............................. B64G 1/00; H04B 7/185
[52] U.S. Cl. .................. 244/158 R; 342/355; 342/357; 455/12.1; 455/13.1
[58] Field of Search .............................. 244/158 R, 164; 342/355, 356, 357, 358; 455/12.1, 13.1

[56] References Cited

U.S. PATENT DOCUMENTS

| | | | |
|---|---|---|---|
| 3,340,531 | 9/1967 | Kefalas et al. | 455/13 |
| 3,349,398 | 10/1967 | Werth . | |
| 3,384,891 | 5/1968 | Anderson | 342/353 |
| 3,497,807 | 2/1970 | Newton . | |
| 4,809,935 | 3/1989 | Draim . | |
| 4,854,527 | 8/1989 | Draim . | |
| 4,872,015 | 10/1989 | Rosen | 342/353 |
| 4,943,808 | 7/1990 | Dulck et al. | 342/356 |
| 5,120,007 | 6/1992 | Pocha et al. . | |
| 5,322,248 | 6/1994 | Ragab . | |
| 5,326,054 | 7/1994 | Turner . | |
| 5,433,726 | 7/1995 | Horstein et al. | 244/158 R |

FOREIGN PATENT DOCUMENTS

| | | |
|---|---|---|
| 365885 | 5/1990 | European Pat. Off. . |
| 510789 | 1/1992 | European Pat. Off. . |

OTHER PUBLICATIONS

Draim et al., "Satellite Constellation for Optimal Northern Hemishpere Coverage" Oct. 1983.
G. V. Mozhaev, "The Problem of Continuous Earth Coverage and Kinematically Regular Satellite Networks II", Cosmic Research vol. 11.
A. H. Ballard, "Rosetta Constellations of Earth Satellites" IEEE Transaction of Aerospace and Electronics Systems, vol. AES–16, No. 5, Sep. 1980, pp. 656–673.
Beste (IEEE) "Design of Satellite Constellations for Optimal Continuous Coverage" May 1978, pp. 466–473.
Neyret et al. "The Intels at VII Spacecraft" AIAA 13th Mar. 1990 Los Angeles CA.
Benedicto (ESTEC) MAGSS–14: Amedium–Altitude Global Mobile Satellite System for Personal Communications Al–Band (Jun. 1992).
Dondl "Digital Network Oriented Mobile Radio Satellite System as an Integrated Part of GSM Cellular Radio System in Europe".

*Primary Examiner*—Andres Kashnikow
*Assistant Examiner*—Virna Lissi Mojica
*Attorney, Agent, or Firm*—Fish & Richardson P.C.

[57] ABSTRACT

A special set of elliptical satellite orbits are described which allow preferential coverage of one parameter over another. According to a first modification, the orbits are retrograde, and preferentially cover one geographical location or time of day as compared with another. A second modification uses prograde orbits and allows the apogee of the orbit to be offset a constant amount with respect to the sun, to thereby cover a different time of day relative to the others. According to a special preferred mode of the invention, the apogee is always pointing towards the sun.

30 Claims, 15 Drawing Sheets

ELLIPTICAL ORBIT SATELLITE, SYSTEM, AND DEPLOYMENT WITH CONTROLLABLE COVERAGE CHARACTERISTICS

This is a continuation-in-part of application Ser. No. 07/892,239 filed Jun. 2, 1992, pending.

FIELD OF THE INVENTION

The present invention relates to elliptical satellite orbits, constellations, methods, and communication systems.

BACKGROUND OF THE INVENTION

The concept of artificial satellites circling the earth was introduced to scientific literature by Sir Isaac Newton in 1686. Things have gotten considerably more complicated since that time, however. The basic concepts of an orbit are described in any orbital mechanics or astrodynamics textbook, such as "Fundamentals of Astrodynamics" by Bate et al. or "Orbital Mechanics" by Chobotov, AIAA Education Series, Publisher. The following definitions of these terms will be first provided here, since they are necessary for proper understanding of the present invention.

The earliest satellites placed into space by man were deployed into very low circular orbits. The resulting visibility footprint of one of these satellites was quite small and a single satellite had the added disadvantage of providing only a few minutes of coverage per day. In fact, it was quite common for an observer on the equator to miss being in contact with such a satellite for several days. Raising the satellite to a higher orbital altitude (e.g., ≈600 nautical miles) helped extend both the coverage footprint, average viewing elevation, and the time in view, but for some missions frequent or even continuous coverage became a requirement. This led to the deployment of early multiple satellite systems, a typical example being the Navy's Transit navigation satellite system. Satellite systems designers were increasingly asked to provide continuous coverage; first, for latitudinal zones and then, for the entire globe.

One of the first constellation designers to study zonal coverage was David Lüders. The Englishman, John Walker, was the first to systematize the design of multiple-ring, multiple satellites per ring, constellations and his work contributed greatly to the optimization of a number of multi-satellite systems (e.g., NAVSTAR GPS). A Russian designer, G. Mozhaev, independently came up with similar arrays using a more theoretical approach based on mathematical set and group theory. Polar constellations often employed the concept of "street-of-coverage", and further coverage improvements were made by Beste, Ballard and Rider. More recently, Hanson and Linden have investigated large arrays of low earth orbit "LEO" satellites (40–200 satellites). All of these designers employed circular orbits; and even with this simplification, constellation design was considered at best a difficult and time consuming trial and error exercise.

The motion of any artificial satellite may be described using a number of parameters. The eccentricity, e, is a measure of the amount of ellipticity. An orbit which has a greater eccentricity number is more elliptical. Eccentricity e=0 would describe a circle, any number between 0 and 1 is an ellipse, and the eccentricity number of 1 or greater would be a parabola or a hyperbola, respectively (curves which never close).

For an elliptical orbit, the earth, or the object being orbited, is at one of the focal points of the ellipse. Therefore, the satellite is sometimes closer to the earth than at other times. The apogee is defined as the point of highest altitude of a satellite, while perigee is the point of lowest altitude.

A retrograde orbit is one in which the direction of revolution is opposite to that of the earth. A posigrade or prograde orbit is an orbit in which the satellite revolves around the earth in the same direction as the earth.

The inclination angle i is an angle measured between the plane of the orbit, and a plane of the reference, usually the Equator. An inclination angle i less than 90° is a prograde orbit, while an inclination angle greater than 90° is a retrograde orbit. A 90° orbit is a polar orbit.

The period, T, is a measure of how long the satellite takes to make one entire orbit. Mean anomaly M is another way to describe the position in the orbit. Mean anomaly is a fictitious angle indicating the fraction of 360 degrees corresponding to the fraction of the period through which the satellite has passed at any point of its orbit.

The Right Ascension of the Ascending Node ("RAAN") is an angle between the first point of Aries (γ), a non-rotating celestial reference, and the line of nodes, which is the line forming the intersection of a plane of the orbit and the plane of the equator. The line of nodes gives a measure of the position or orientation of the orbit. The longitude of the ascending node Ω is the angle between the i unit vector (pointing towards the Greenwich meridian) and the ascending node in the rotating reference.

The argument of perigee ω is an angle measured in the plane of the orbit between the point of the ascending node and the nearest point of perigee.

Most practical satellites prior to the invention by the present inventors used relatively simple systems based on circular orbits. The earth was covered symmetrically by multiple satellites, which each operate to cover a section of the earth.

Elliptical orbits have been typically avoided in the art, because of their asymmetries, and the consequent problems that they might cause. However, some individual elliptical orbits and elliptical orbit constellations have been proposed. The Russian Molniya orbit is a posigrade orbit designed for polar and high latitude coverage. Other posigrade orbits have been described by John Draim in his U.S. Pat. Nos. 4,809,935 and 4,854,527.

U.S. Pat. No. 4,809,935 describes a three-satellite constellation giving continuous coverage of the entire Northern hemisphere, and an extension of this constellation to include an equatorial orbit resulting in a four-satellite array giving continuous global coverage of both hemispheres. This latter four satellite array provided somewhat higher elevation coverage in the Northern hemisphere than in the Southern Hemisphere.

U.S. Pat. No. 4,854,527 describes a common period four-satellite array giving continuous global coverage with satellites at a lower altitude range than in the first patent. A discussion of obtaining extra Northern Hemisphere coverage through use of elliptic satellite constellations may be found in ANSER Space Systems Division Note SpSDN 84-1, "Satellite Constellation Design Techniques for Future Space Systems" dated September 1984, by John Draim, and James Cooper. Another application of posigrade elliptic orbits is the ACE and ACE-Prime orbits developed by Mr. A. Turner of Loral Corporation.

The present invention also simplifies the design of the solar panels by requiring no more than 1 or 2 degrees of freedom. In the example orbit discussed herein which is 116° retrograde, the panels need only one degree of freedom. In a similar way, a satellite usually needs to radiate its heat toward cold, empty space. In the present invention, it is much easier to face the satellite in a way that always faces the heat radiators away from the sun.

It is also well known that the earth is not totally spherical, but actually it is rather oblate. That is, the earth is bigger at the bottom than it is at the top. The $J_2$ harmonic, due to the earth's oblateness, causes the node $\Omega$ and argument of perigee $\omega$ of an orbit to change. The gravitational pull of the earth's equatorial bulge causes, for example, the orbital plane of an eastbound satellite to swing westward. More generally, the force component is directed towards the Equator. This resultant acceleration causes any satellite to reach the Equator (node) short of the crossing point where it would have reached it on a spherical earth. For each revolution, therefore, the orbit regresses $\Delta$ amount. These effects have been the subjects of various attempts at compensation.

Sun synchronous circular orbits are also known. These are orbits where the rotation rate of the right ascension of the ascending node is equal to and in the same direction as, the right ascension rate of the mean sun.

SUMMARY OF THE INVENTION

The previous specification, of which this is a continuation-in-part, described the invention of non-uniform capacity distribution tailored by latitude and population. This was done using an elliptical satellite array. The present specification adds additional information to the basic elliptical orbit. A first embodiment of the present invention is tailored by latitude and population. A second embodiment is also tailored by time of day. The present invention describes a specific way of carrying out these options by using a retrograde inclined orbit, and/or a sun synchronous apogee, elliptical orbit, which is equatorial, and also describes many ways of expanding the design space.

The parent specification achieved the geographical discrimination. The present specification improves on this basic technique by using the perturbation to achieve various effects. The present inventors started with a canonical form for the equation of motion of satellites in orbit. Two cases were discovered by the present inventors: 1) one parameter fixed at 116°, to form a retrograde elliptic sun synchronous orbit, and 2) both parameters varied to form a sun synchronous apogee orbit where the apogee always points in a constant direction relative to the sun. This resulted in an expansion of the possible space which allows time of day tailoring of coverage. Such was completely unheard of before the present invention, except for certain conditions such as circular inclined orbit, or the ace equatorial orbit. The present invention, in contrast, allows an entire domain of applicability of these two conditions in order to obtain various unheard of combinations. According to the present invention, two embodiments are described: A first of which includes inclined sun synchronous orbit and a second which includes constant pointing apogee orbits. Both of these are based on the effects on orbits from the $J_2$ term.

We have found a way to exploit the effects of earth's oblateness, with an elliptical orbit, such that for certain combinations of orbital parameters, the secular perturbations due to the earth's $J_2$ gravitational term may be used to advantage. Specifically, we noticed that the effects on the $\omega$ and $\Omega$ terms could be used to compensate the orbit of the satellite to obtain certain controllable effects. These controllable effects are obtained taking into account that the earth revolves relative to the sun by 0.9856°, of orbit around the sun, per day. The present invention uses perturbations arising from the $J_2$ terms, to precess the orbits in time with respect by following the general equation $$\frac{d\omega}{dt} + \frac{d\Omega}{dt} = 0.9856 \quad (1)$$

to obtain elliptical orbits which have controllable and constant characteristics, and which asymmetrically cover one parameter of coverage preferentially over another in a way which is constant relative to the sun, all year round. According to a first embodiment of the invention, that parameter of coverage is geographical location, and according to another embodiment of the invention, that parameter of coverage is time of day.

Kepler's law of motion governs any orbit. In any orbit, including an elliptical orbit, areas swept out in equal times must be equal. Hence, a satellite in an elliptical orbit spends more time towards apogee than it does towards perigee. We have exploited this effect, to bias the effective orbits to increase coverage at certain geographical locations and/or times. According to the first aspect of the present invention, a first operation is carried out to set the change in $\omega$, d/dt ($\omega$) to approach 0. The change in $\Omega$ is then set to 0.9856°/day. Combining this with a retrograde orbit produces a set of specific characteristics referred to herein as a design space. This design space includes retrograde orbits which favor one geographical location on the earth over another.

One recognition of the present invention is that the Northern Hemisphere includes a majority of the world's earth masses and population. By covering the Northern Hemisphere preferentially over the Southern Hemisphere, the coverage can be equalized as a function of population.

A second embodiment of the present invention uses prograde orbits, using the more general equation 1. In the second embodiment, d/dt ($\omega$) does not approach 0. Instead, the parameters d/dt ($\omega$) and d/dt($\Omega$) are both variable, but only in a way that meets the general equation $$\frac{d\omega}{dt} + \frac{d\Omega}{dt} = 0.9856 \quad (1)$$

We have found that this produces an orbit where the apogee always points in a specific direction relative to the sun. This can be used to increase the satellite daytime coverage effect, or the effect from 9 AM to 5 PM for example. Of course, more people require satellite services during business hours than at any other time. Hence, there is more of a demand for satellite service during the day than there is at night.

After identifying the advantages possible from an elliptical orbit in this way, we have identified a technique of choosing parameters of orbits such that different areas will always be preferentially covered during the day.

The present invention teaches construction of a satellite orbit, a satellite system, a method of operating a satellite system, and a method and apparatus of deploying a satellite into a prescribed orbit, all using orbital parameter combinations with integral or non integral mean motions specified within the design space that covers a specified set of earth (or planet) coverage requirements in a more optimal manner than is obtained through more conventional orbits.

The objects of the present invention include:

Construction of a satellite orbit using inclined orbital parameter combinations within a design space that extends the latitude ranges in order to meet earth (or planet) coverage requirements in a more optimal manner than are obtainable through conventional circular sunsynchronous type orbits.

Construction of a satellite with argument of perigee value other than 90 or 270 degrees, such that the apogee locations may be preferentially oriented in any desired direction, preferably towards the earth-sun line, giving more extensive (in both time and earth central angle) coverage, and such that improved coverage during daylight hours is achieved, than during nighttime hours, for locations at all longitudes from −180 to +180 degrees (or 180 W to 180 E).

Provision of the required satellite elevation angles within specified latitude ranges, with appropriate day-night biases, for the retrograde elliptic orbit defined.

Provision of a satellite orbit that maintains its integrity year-in year-out through precise orbital injection control so that coverage characteristics are maintained throughout the satellite constellation lifetime. Note: minor orbital adjustments may be required to account for smaller perturbations, e.g. third order or higher and/or solar perturbations, which are experienced by the satellite.

The novel features of this aspect include:

greater satellite Earth coverage can be provided during the daylight hours (or business day, when there is heavy utilization of telecommunications or other useful services), 116.565 degree orbit plane inclinations, as described according to the first preferred embodiment will provide continuous coverage of the high latitude and polar regions with elliptic orbits, not obtainable from equatorial plane orbits.

Relatively low orbits, which can be obtained using corresponding smaller rocket boosters.

BRIEF DESCRIPTION OF THE DRAWINGS

These and other aspects of the invention will now be described in detail with reference to the accompanying drawings, wherein.

DESCRIPTION OF THE PREFERRED EMBODIMENT

Figure 1:
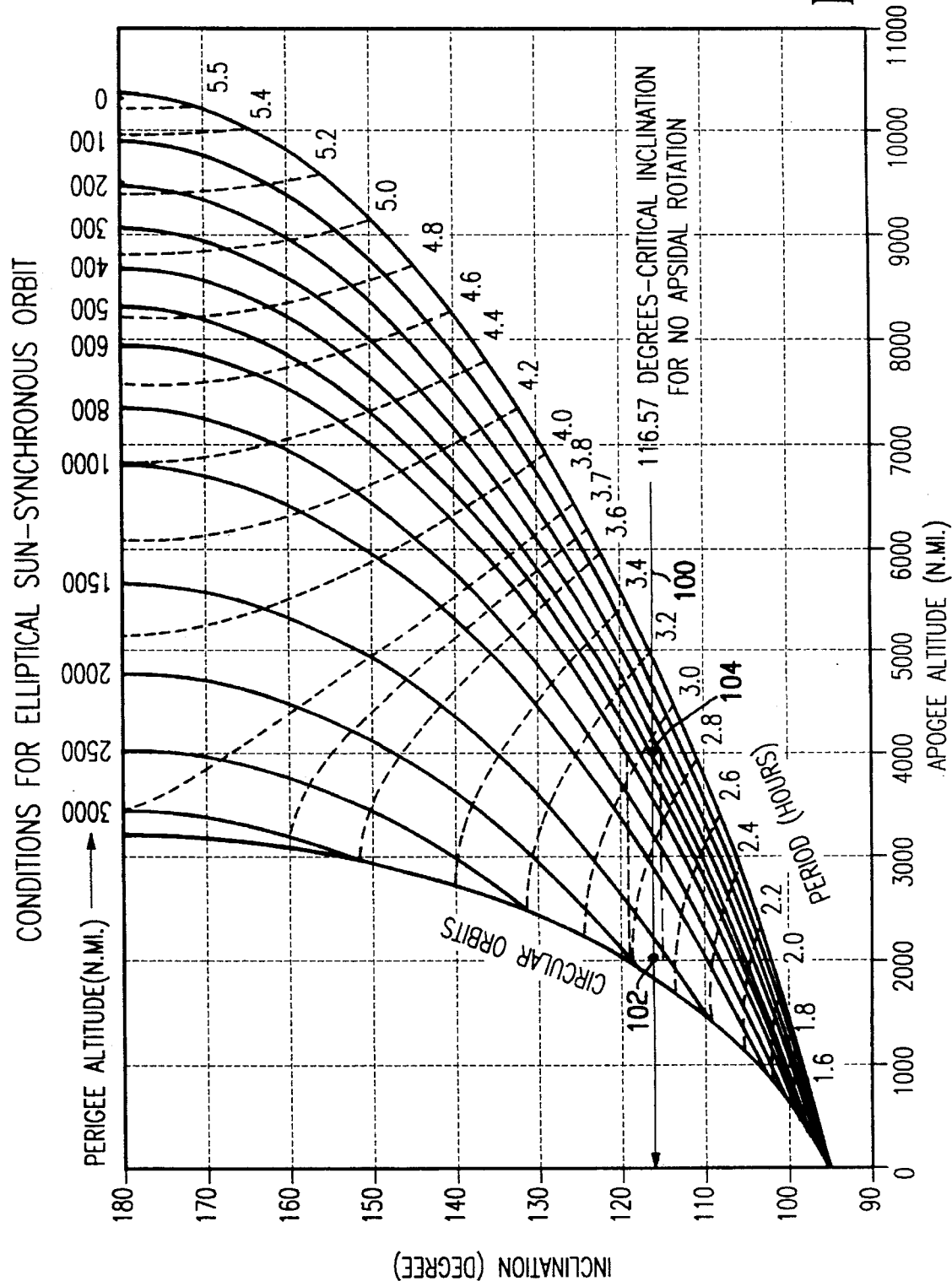
FIG. 1 shows a first design space for elliptical sun synchronous retrograde orbits according to a first embodiment of the present invention.

The present invention exploits the gravitational effects from the earth's oblateness, in combination with a preferably elliptical orbit, to allow preferential coverage of different parts of the earth as a function of parameters which are related to satellite demand. This has significant advantages since it allows preferential coverage based on a chosen characteristic, here either one hemisphere over the other, or time of day.

For instance, a satellite system primarily intended for use over the United States would prefer to preferentially cover the Northern hemisphere as opposed to the Southern hemisphere. More specifically, by choosing elliptical orbits such that anything above 40° south latitude was covered, a great majority of the world's land mass could be covered without wasted capacity.

This embodiment of the invention optimizes the characteristics of the elliptical satellite to have desired coverage characteristics. According to this first preferred mode, structure is described for putting a satellite in a special orbit which preferentially covers part of the earth over the other part.

The first type of orbits, discussed according to the present invention herein, are elliptical retrograde orbits which provide preferential coverage of one part of the earth over the other part through adjustment of orbital parameters.

As mentioned above, all orbits are effected by the earth's $J_2$ gravitational term. This term effects the $\Omega$ and $\omega$ terms of every orbit. In order to compensate the orbit, the general equation $$\frac{d\omega}{dt} + \frac{d\Omega}{dt} = 0.98 \quad (1)$$

must be satisfied. This first embodiment takes a special case of the equation (1).

The significance of the constant on the right hand of the equality sign in Equation (1) lies in its synchronism with the Earth's yearly motion about the Sun. In order to preserve the orientation of the orbital plane with respect to the earth-sun line, it is necessary to advance the plane of the orbit by 360 degrees/365.25 days or 0.9856 deg/day.

Specifically, the effect of $J_2$ term on $\Omega$ and $\omega$ can be expressed as follows:

$$\frac{d}{dt}\Omega_{J_2} = 1.5nJ_2(R_E/a)^2(\cos i)(1-e^2)^{-2} \quad (3)$$
$$\equiv -2.06474 \times 10^{14} a^{-7/2}(\cos i)(1-e^2)^{-2}$$

$$\frac{d}{dt}\omega_{J_2} = 0.75nJ_2(R_E/a)^2(4-5\sin^2 i)(1-e^2)^{-2}$$
$$\equiv 1.03237 \times 10^{14} a^{-7/2}(4-5\sin^2 i)(1-e^2)^{-2}$$

, where n is the mean motion in degrees per day, $R_e$ is the earth's equatorial radius, a is the semi major axis in kilometers, e is the eccentricity, i is the inclination and the change in $\Omega$ and $\omega$ are both in degrees per day.

According to this first embodiment, we want to make the $d\omega/dt$ term approach zero. Luckily, this can be easily done by adjustment of the sine term in equation 3 to zero. Therefore, we set $5\sin^2 i=4$, requiring that $\sin^2 i=4/5$ or i=arc sin {square root (4/5)}; so i=63.435° or its complement 116.565°.

This embodiment preferably uses an elliptical orbit of 116.565 degrees. The prior art has used circular sun synchronous orbits. All so-called circular orbits may have some slight degree of ellipticity. For purposes of this specification, an elliptical orbit is defined as an orbit whose ellipticity is greater than 0.002. This effectively excludes circular orbits which are slightly elliptical due to imperfections in the orbits. These elliptical orbits, with e≈0.001 are sometimes called frozen orbits.

Therefore, we set $$\frac{d}{dt}$$

(ω) to zero, and we set $$\frac{d}{dt}$$

(Ω) to +0.9856, the amount per day by which the earth revolves around the sun. By substituting this into equation (3), a set of combinations of apogee, perigee and inclination are found which satisfy the attached formula which are shown in the attached FIG. 1.

For an elliptical sun synchronous orbit, only a very small circumscribed part of this design space can be used. First, this satellite should have no apsidal rotation, to keep the apogee in one hemisphere. Accordingly, the inclination must be 116.565°. A certain amount of leeway is possible, however, and practically speaking the orbit can be inclined anywhere between 115° and 118° and still obtain sufficiently stable characteristics, although some minor orbit corrections may be necessary from time to time.

Along this line, only a certain class of orbits are usable. Circular orbits are known in the prior art, and do not have the ability to produce the preferential coverage characteristics in the way done according to the present invention. Therefore, a leftmost limit on the design space shown by point 102 in FIG. 1 represents the limit to require an elliptical orbit. The rightmost limit is set by the minimum satellite height at perigee. A satellite orbit should be, practically speaking, greater than, for example, 100 nautical miles. Preferably, the lowest limit is 250. The point 104 represents the position where perigee will fall below 100 nautical miles. Therefore, the design space extends between the points 102 and 104. Within this design space, the inclination varies between 115° and 119°. The usable design area is therefore shown in the box in FIG. 1.

Within that box, period varies from 2.6 to 3.1 hours, apogee varies from 100 to 4600 nautical miles, and perigee varies from 100 to 2200 nautical miles.

These orbits allow the coverage to be adjusted, or biased, to favor the Northern hemisphere over the Southern hemisphere.

More specifically, the allowable range of orbital parameters includes orbital periods between 2.68 and 3.1 hours, and orbital eccentricities between 0.002 and 0.38.

The postulated orbit preferably has an orbit or orbits with the integral period value of 3.0 hours. This 3-hour orbit with corresponding mean motion of an even 8 revolutions per day will result in a repeating ground track. The use of other, non-integral values for orbital period(s) still results in the satellite's ground track crossing the Equator on the ascending and descending nodes at given values of local time, but the points of such crossings will not now occur at fixed longitudinal points. Any point along the design space horizontal line (116.565 degrees) may be selected to provide a base line set of orbital parameters upon which such an orbit or constellation may be configured.

Applications

This invention may be used for communications, earth sensing, surveillance, weather, or any other satellite function found useful for satisfying mission requirements. The invention can be used in a single satellite mode, and will provide better coverage during daylight hours than during nighttime hours. Effectively, coverage is "stolen" from nighttime coverage and diverted to daytime coverage. The most probable future application of the invention in this case will be found in the construction and use of ordered arrays (or constellations) of such satellites.

In order to show how this system would be used, a few examples from the design space in FIG. 1 will be discussed herein. These examples are analyzed using a computer program such as Orbital Workbench, or OSAC written by the Naval Research Lab, or Graftrak, available from Silicon Solutions, Inc; Houston Tex. This program is run with the inclination, apogee and other information from the chart in FIG. 1. The characteristics of that orbit are obtained. Then, the desired characteristics are used to modify the orbit until the proper places from the design space are identified. Some preferred orbits according to the present invention will be described herein.

The second embodiment of the present invention is one which produces a special kind of elliptical orbit. This special orbit has a constant-pointing apogee, which faces in a constant direction relative to the sun all year round. This is obtained by a posigrade orbit in which the equation $$\frac{d\omega}{dt} + \frac{d\Omega}{dt} = 0.98 \tag{1}$$

is satisfied.

Figure 2:
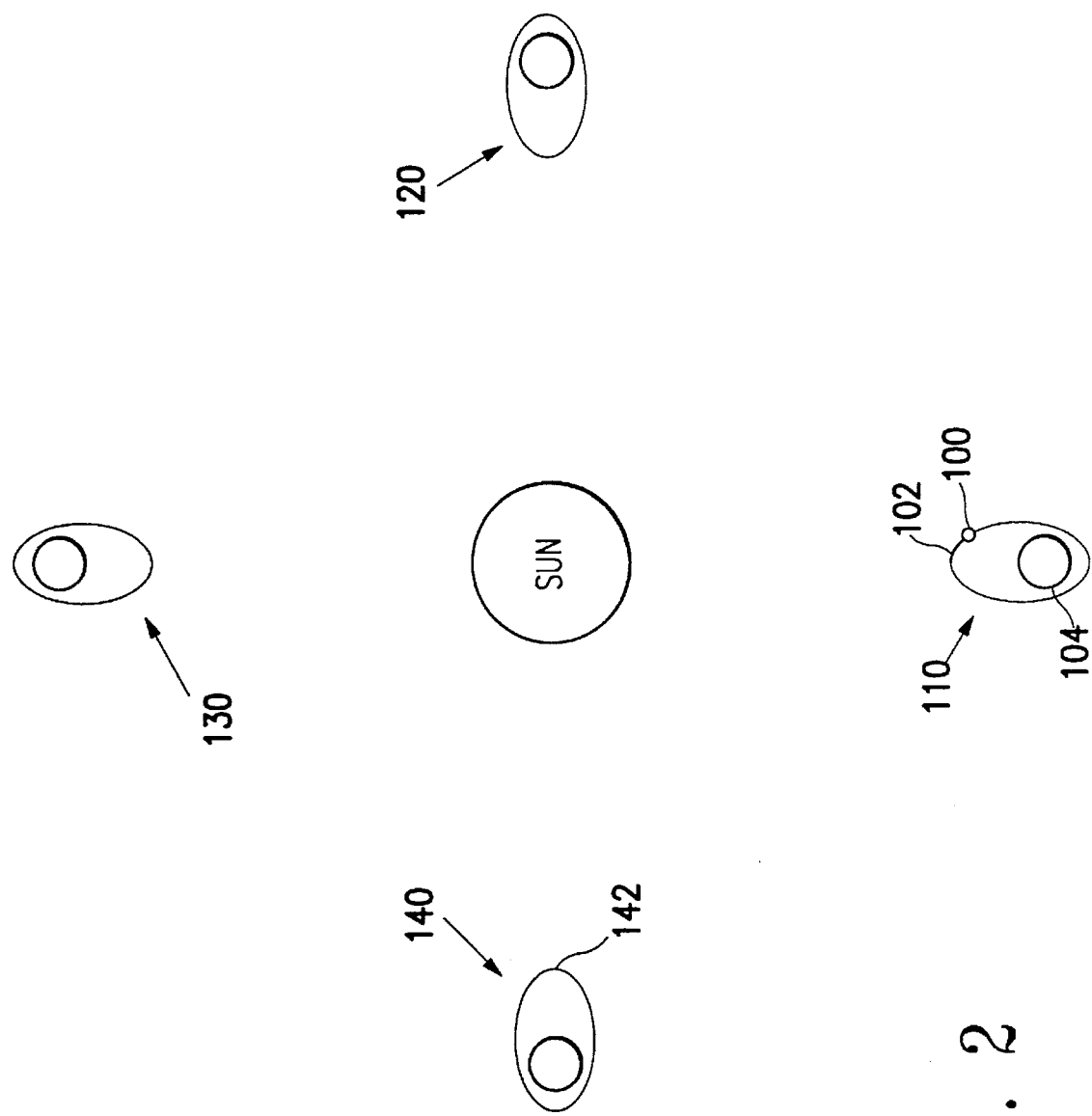
FIG. 2 shows the characteristics of a special orbit according to a second embodiment of the present invention in which the apogee is always pointing towards the sun.

FIG. 2 shows a resulting sun synchronous orbit with apogee pointing towards the sun. This preferred embodiment of the present invention comprises a satellite in an orbit which has a sun synchronous apogee which assumes an orbit around the earth such that the apogee of the satellite is always facing towards the sun. The satellite 100 is shown with its orbit 102, orbiting the earth 104. Different seasons find the earth at different portions around the sun, and these portions are shown as positions 110, 120, 130 and 140. The apogee point, shown as element 142, is always facing the sun.

Figure 3:
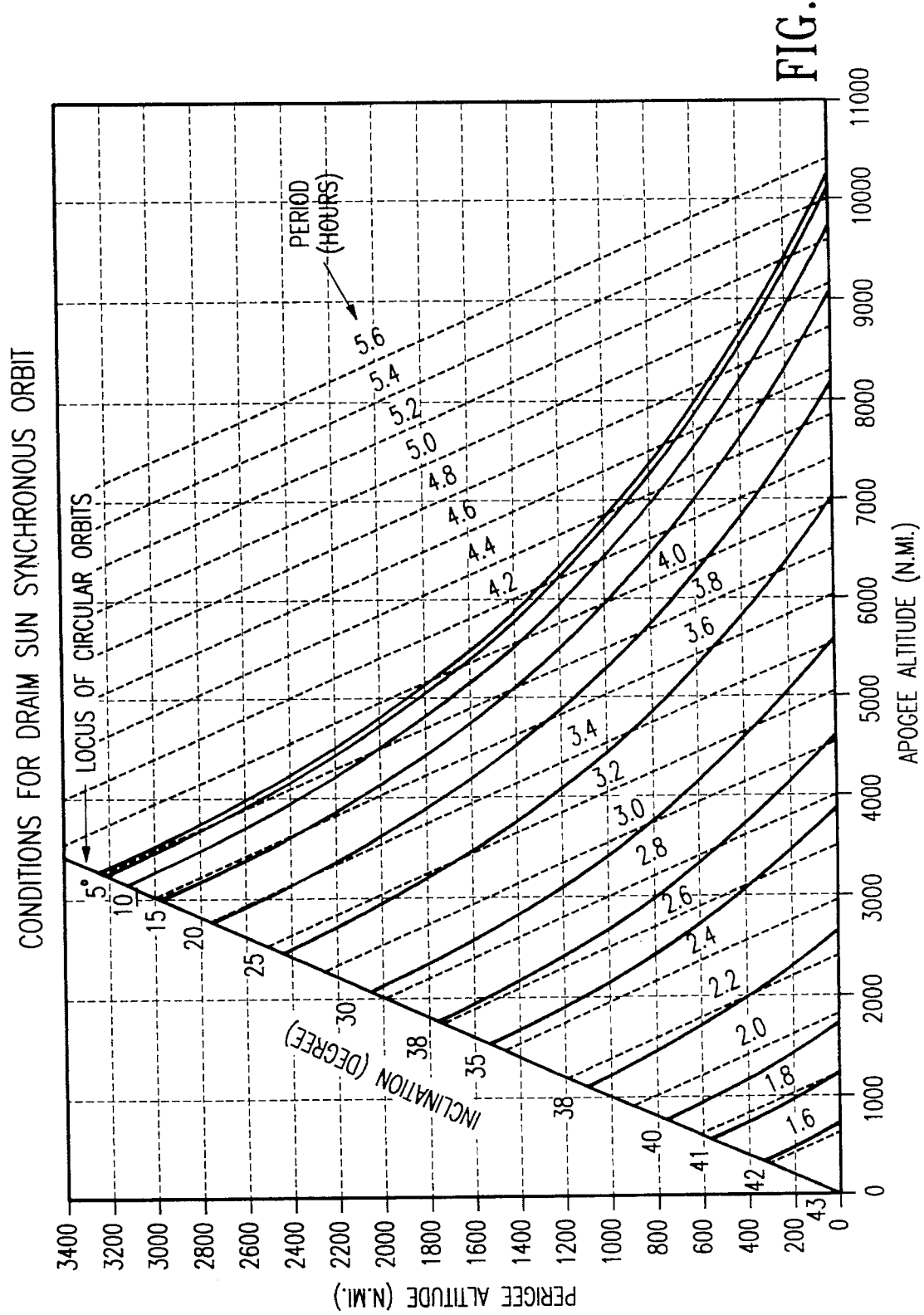
FIG. 3 shows a design space for this second embodiment of the present invention using prograde orbits.

To obtain the preferred operating range for this equation, the equations $$\frac{d}{dt}\Omega_{J_2} = 1.5nJ_2(R_E/a)^2(\cos i)(1-e^2)^{-2} \tag{3}$$

$$\cong -2.06474 \times 10^{14} a^{-7/2}(\cos i)(1-e^2)^{-2}$$

$$\frac{d}{dt}\omega_{J_2} = 0.75nJ_2(R_E/a)^2(4-5\sin^2 i)(1-e^2)^{-2}$$

$$\cong 1.03237 \times 10^{14} a^{-7/2}(4-5\sin^2 i)(1-e^2)^{-2}$$

are combined with equation (1) to plot the characteristics shown in FIG. 3. FIG. 3 shows the apogee altitude, perigee altitude, and inclination forming the design space. As in the first embodiment, only certain parts of this design space can be used. For example, the practical limit on the altitude of a satellite is greater than 100 nautical miles. All other parts of this design space can be used.

These orbits have characteristics which are synchronous with respect to the time of year. By specifying any initial RAAN and epoch, therefore, the Right Ascension of the apogee of this orbit will stay constant over time with respect to the sun. For one special class of orbits, the apogee will always be pointing towards the sun as shown in FIG. 3. For another special class of orbits, the apogee will be pointing for example at 2 degrees relative to the sun. In any of these orbits, therefore, the apogee is controlled to be constant.

For this embodiment, the apogee is always at a constant right ascension angle from the right ascension of the earth-sun line: usable inclinations range from 0 to 43 degrees, usable periods from 1.7 to 5.0 hours (again, preferably 3 hours to obtain a repeating ground track), and usable eccentricities from 0.0002 to 0.56.

A few examples of how these orbits would be chosen and the characteristics thereof are explained herein.

According to another preferred mode of the invention, the first and/or second embodiments are further modified to include multiple satellite configurations. This modification comprises a constellation of satellites which preferentially cover the Northern hemisphere, as compared with the Southern hemisphere or vice versa.

Figure 4:
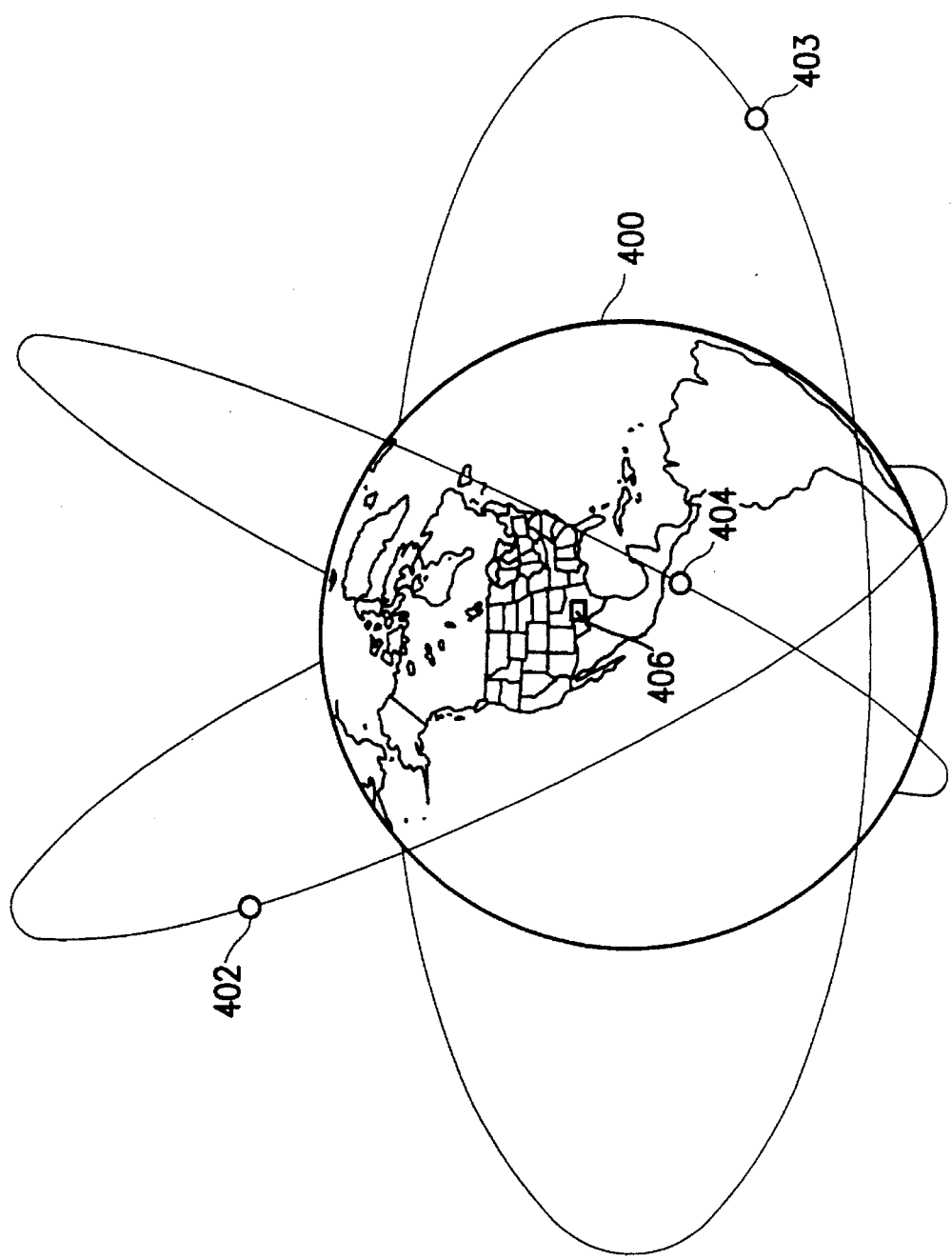
FIG. 4 shows a constellation of satellites, each orbiting and communicating with earth stations on the earth.

The constellation of satellites orbiting the earth 400 is shown in FIG. 4. Of course, it should be understood that while FIG. 4 shows only three satellites, 402, 403, and 404, in reality there would be many more. These two satellites are located and operate to preferentially cover one portion of the earth over another (first embodiment) and/or one time of day (second embodiment) over another.

Each of the satellites communicates with a earth-based earth station, shown schematically as station 406, in a conventional way to exchange information therewith. Accordingly, the present invention also contemplates use of an earth station with such satellites, this earth station having characteristics to track satellites having the characteristics discussed above, and to communicate therewith. There are a plurality of earth stations, each positioned on the earth, and each including tracking equipment to track a motion of at least one of said satellites. Each earth station, and each satellite also includes communication equipment to communicate between the earth station and the at least one satellite.

Figure 5:
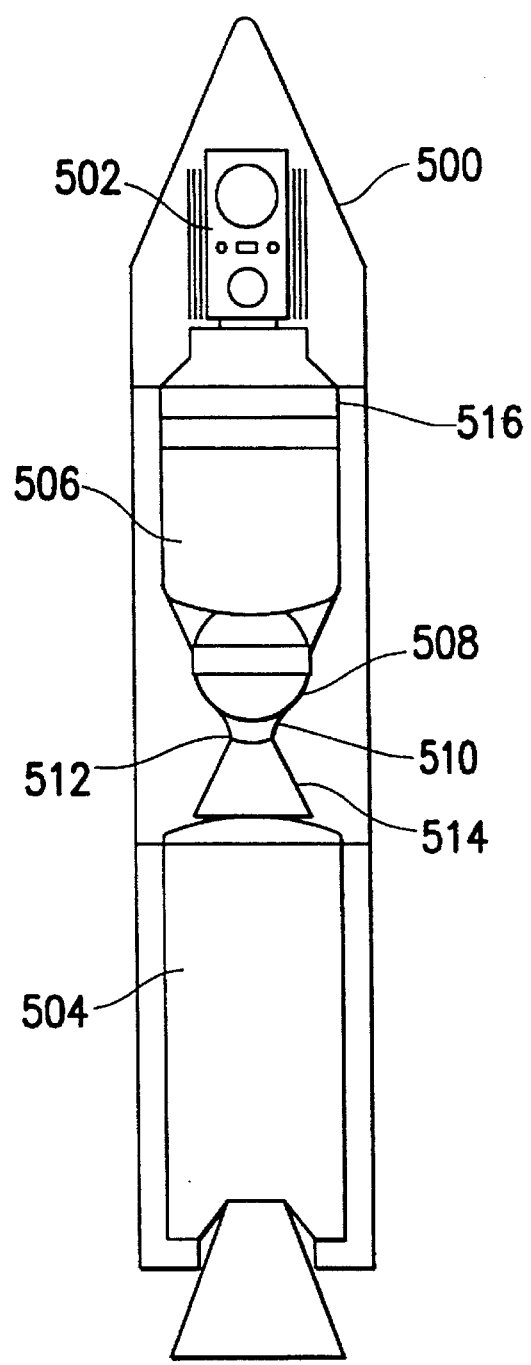
FIG. 5 shows a rocket and inertial guidance unit used according to the present invention to propel the rocket into orbit.

The satellites according to the present invention are initially boosted into their orbits by special rockets of the type intended to deliver satellites. One such rocket, 500, with the satellite 502 therein is shown in FIG. 5. The rocket includes a first stage engine 504, of any known solid or liquid fuel type, and a second stage engine 506. Rocket engines are well known in the art, and it will be assumed that the second stage engine is a liquid type rocket fuel engine. This engine combines a liquid fuel with an oxygenator at point 508, which ignites the fuel. The ignition accelerates the speed of the fuel through a constriction 510, causing a sonic shock wave shown as 512 which travels out the output nozzle 514. (It must be understood that the fixture in FIG. 5 shows this stage rocket with the first stage still attached.)

The rocket is controllable both in direction and in thrust. More generally, the vector control of the rocket is controllable.

The rocket is controlled by an onboard navigation computer 516. The basic characteristics of a booster rocket and guidance unit are shown, for example, in U.S. Pat. No. 4,964,340, the disclosure of which is herewith incorporated by reference.

According to a fourth embodiment of the rocket of the present invention, the inertial guidance unit is controlled to boost the rocket into an elliptical retrograde orbit selected from the design space box around line 100 shown in FIG. 1. The satellite is then delivered into that orbit, to maintain that orbit.

According to a fifth embodiment of the present invention, the rocket of FIG. 5 has an internal guidance unit which is programmed to boost the rocket into a posigrade orbit of an elliptical type, selected from the design space shown in FIG. 3. At that time, the satellite is released into the orbit, to thereby maintain thereafter the appropriate orbit.

The third, fourth and fifth embodiments are usable in combination with either of the first or second embodiments described above.

Some examples of the preferred orbits used according to the present invention will now be described.

First preferred orbit configuration

The first preferred orbit is a four satellite minimum array ring which covers any northern hemisphere region north of 20° north latitude during daylight hours, with a minimum 15 degree elevation angle σ. The satellites have an optimized afternoon ascending node, a three hour period and an argument of perigee ω other than 270. The ellipse actually therefore tilts towards the sun and provides a ring of orbits which are both sun synchronous and always have their apogee pointing towards the sun.

The characteristics of these orbits are such that the satellites appear to be moving backwards from west to east since they are in retrograde orbit.

Using the basic satellites discussed above, selection of the main orbital parameters were adjusted through trial iterations beginning around the beginning values of ω=270 and RAAN=F(YY, MM, YY, HH, MM, and SS). The resulting graph track view show visibility circles and lines which reach down to a certain latitude.

This system is very unique, since with only four LEO-MEO satellites, all regions north of 20° latitude can be covered with visibility angles of 15°. It would take three to four times as many circular satellites to do the same thing.

Second preferred orbit configuration

The second preferred orbit covers everything in the northern hemisphere above 20° north latitude both day and night. One ring of satellites has noon ascending nodes and the other has midnight ascending nodes. This has the significant advantage of simplifying the design of the solar array of the satellite.

Most satellites have solar arrays, which need to face the sun in order to power the satellite. If we use an orbit like the present example, then this solar array needs only one degree of freedom to follow the sun. This simplifies the satellite design. This requirement is satisfied by placing one ring with noon ascending nodes and another ring with RAANs displaced 180° from the first ring and having midnight ascending nodes.

Figure 6:
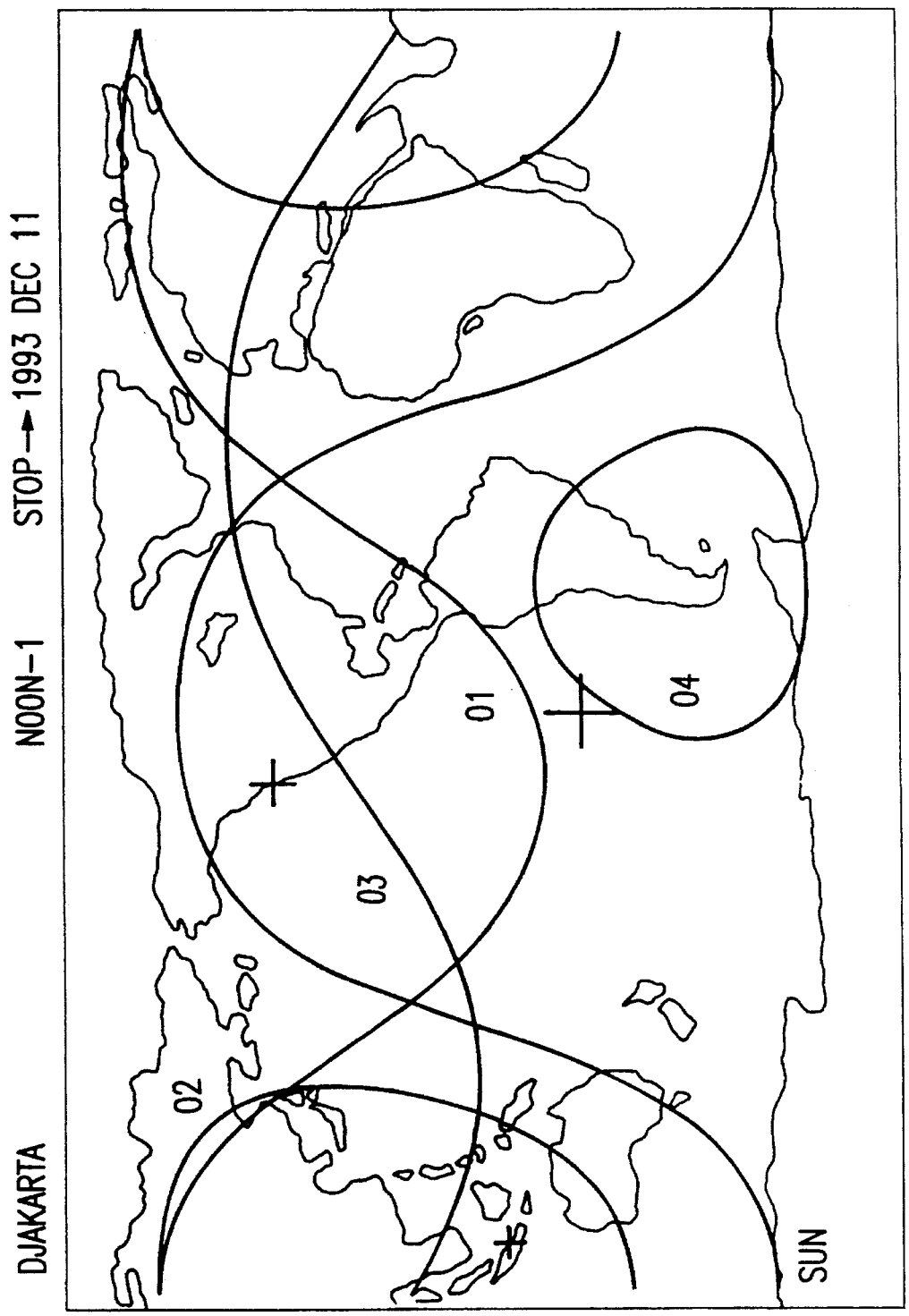
FIGS. 6, 7A, 7B, 8A, 8B, 9A, 9B, 9C, 10A and 10B show characteristics of preferred orbits of the present invention.
Figure 7A:
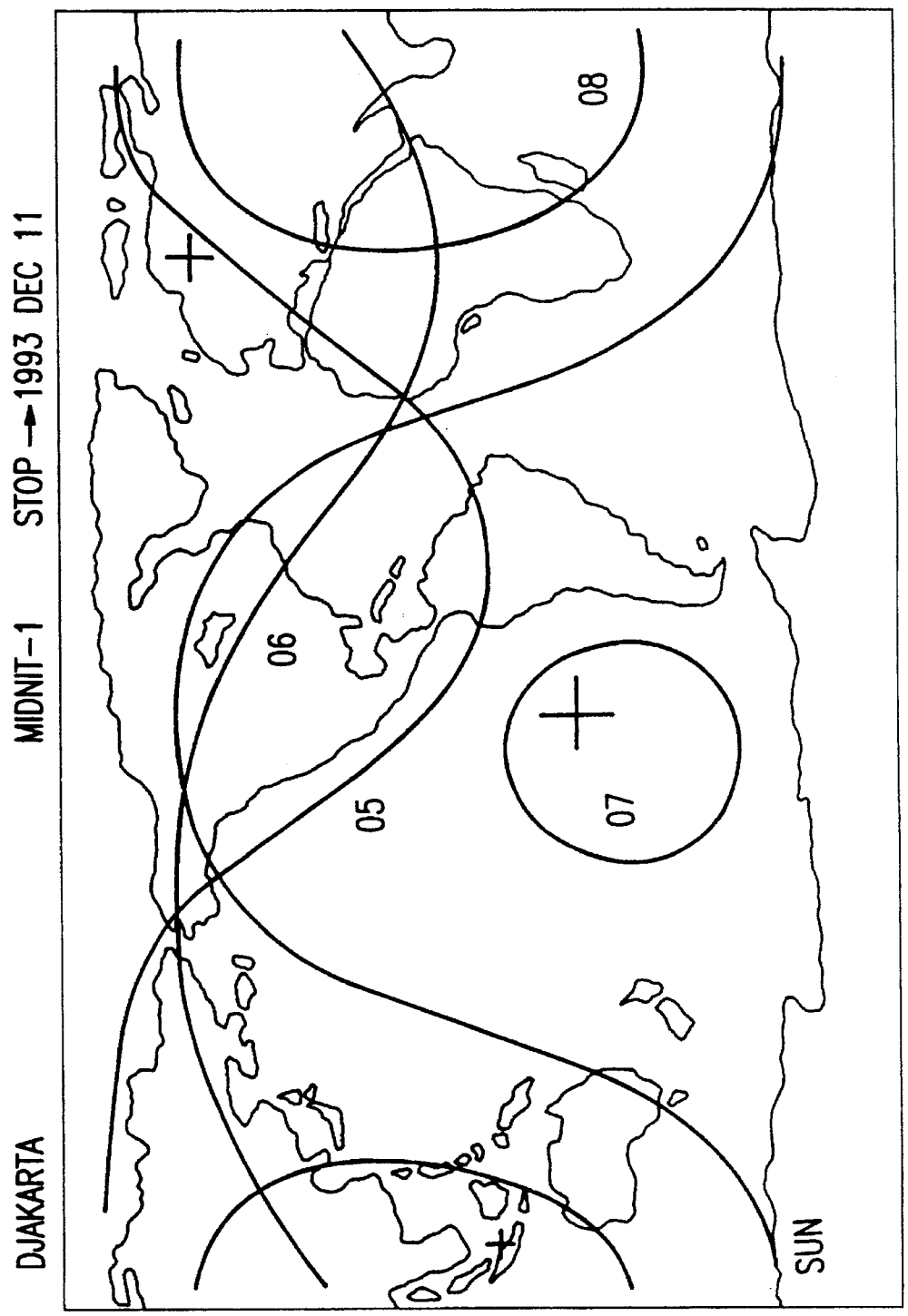
Figure 7B:
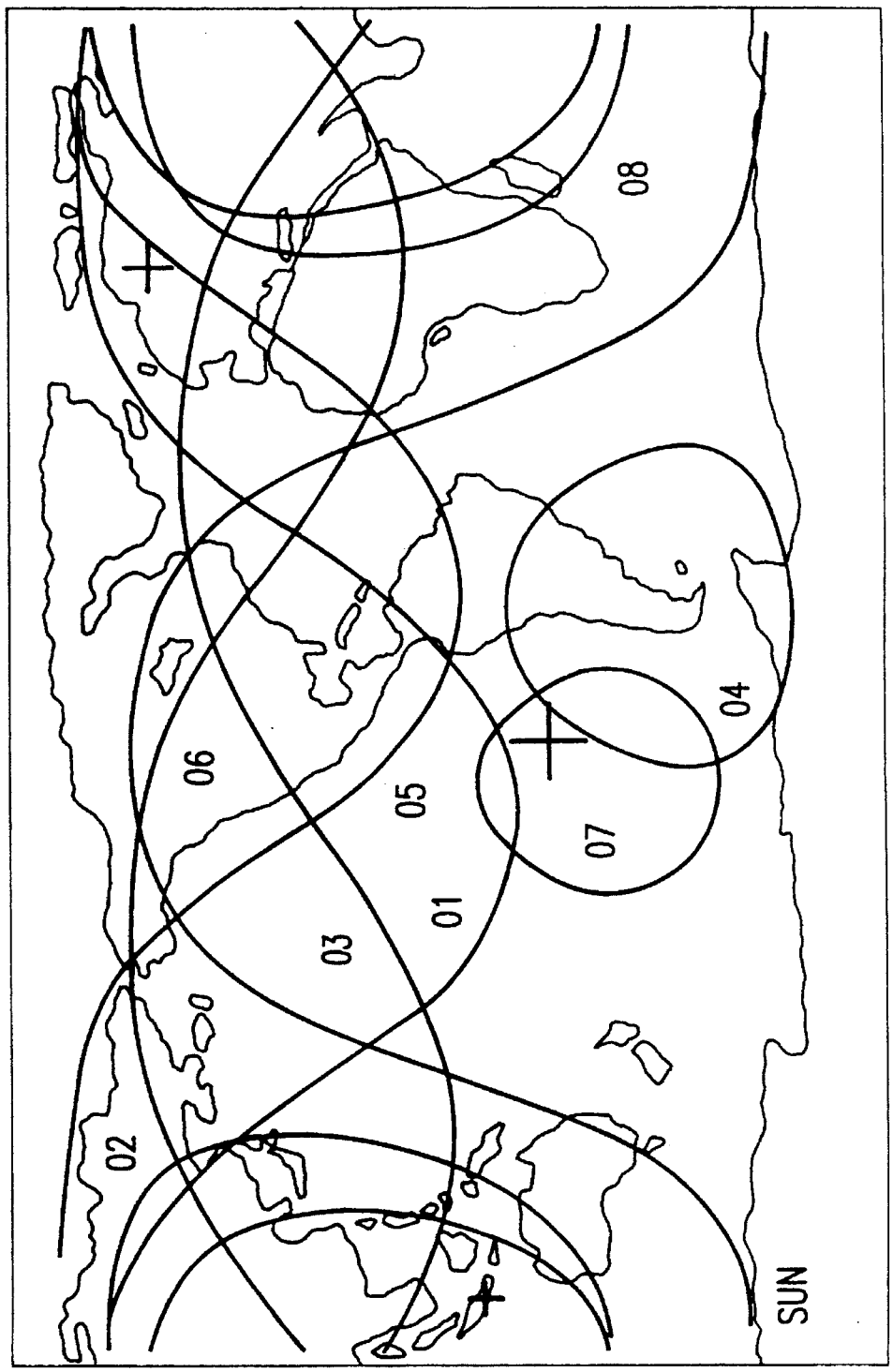

FIGS. 6, 7A and 7B show this basic orbit. FIG. 6 shows the noon orbit, and the four satellites therein, labelled 01, 02, 03, and 04. FIG. 7A shows the midnight ring, with the satellites labelled 05, 06, 07, and 08. FIG. 7B shows the noon plus midnight rings. The combined view of FIG. 7B shows that most of the coverage is in the northern hemisphere. There is only spotty coverage in the southern hemisphere, but the clustering is in the north.

Third preferred orbit configuration

A third example is a six satellite equatorial, prograde, apogee pointing towards the sun orbit. This third example uses terms of the formula for advance of the line of nodes at 0.9856° per day and provides an extra degree of redundancy and higher elevation angles in the tropical and equatorial zones.

Fourth preferred orbit configuration

Figure 8A:
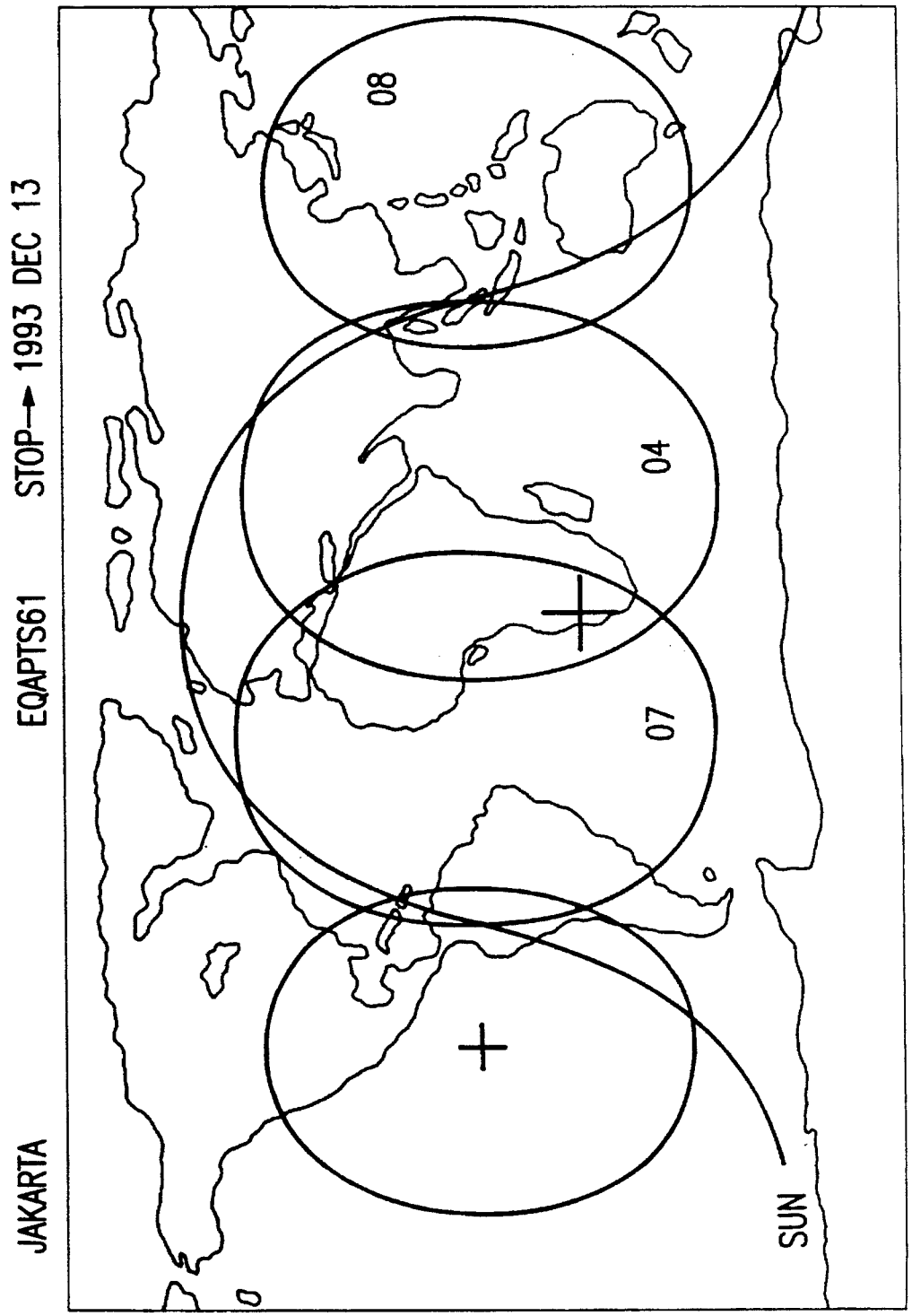
Figure 8B:
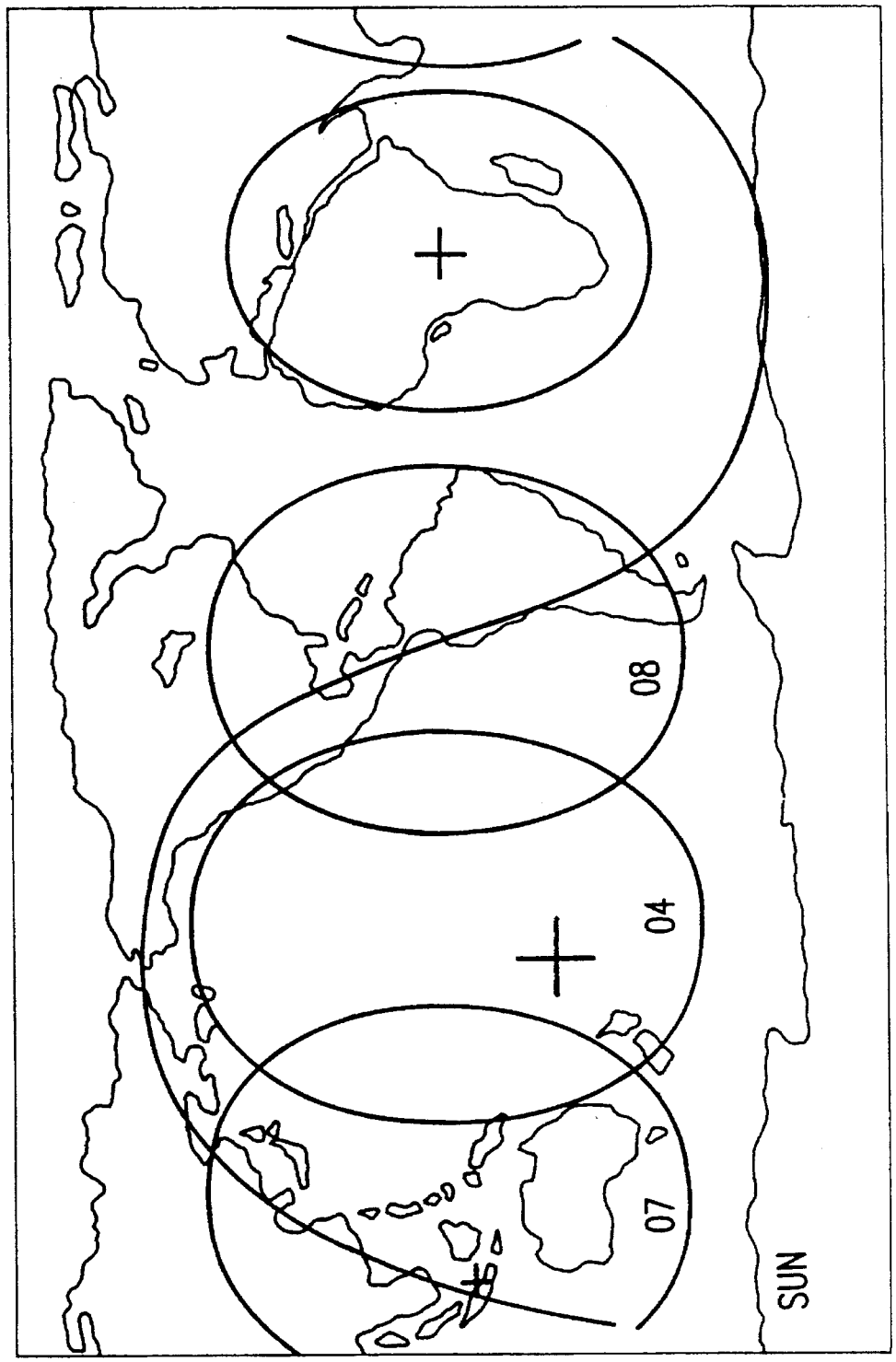

The fourth example is another equatorial prograde orbit with apogee pointing towards the sun with only four satellites. This array emphasizes continuous equatorial region daytime coverage with visibility angle of 10°. FIG. 8A shows 1100 GMT which is daylight over Europe, and shows that most of Europe is well covered. However, Europe is less well covered at 2300 GMT shown in FIG. 8B.

Fifth preferred orbit configuration

Figure 9A:
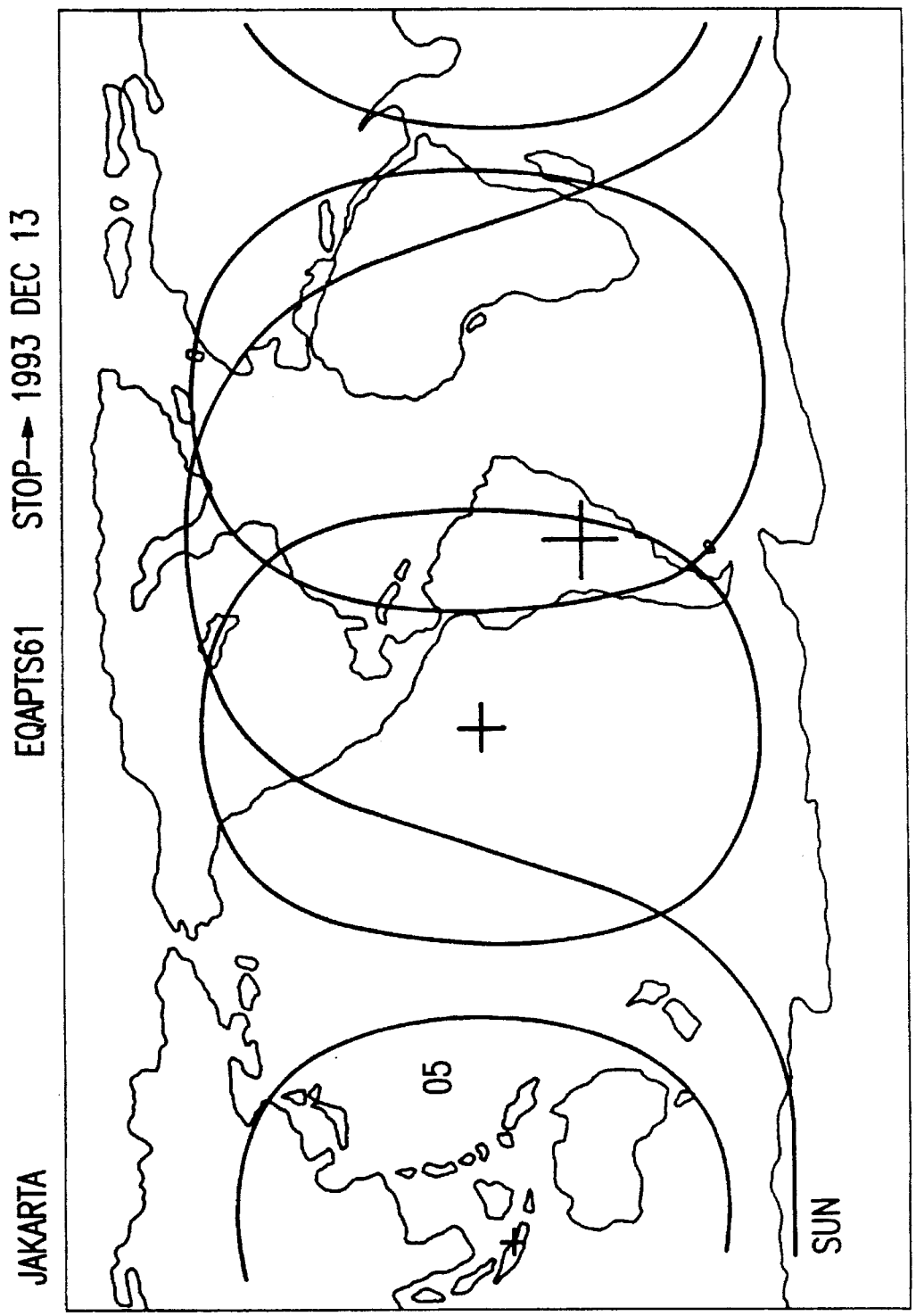
Figure 9B:
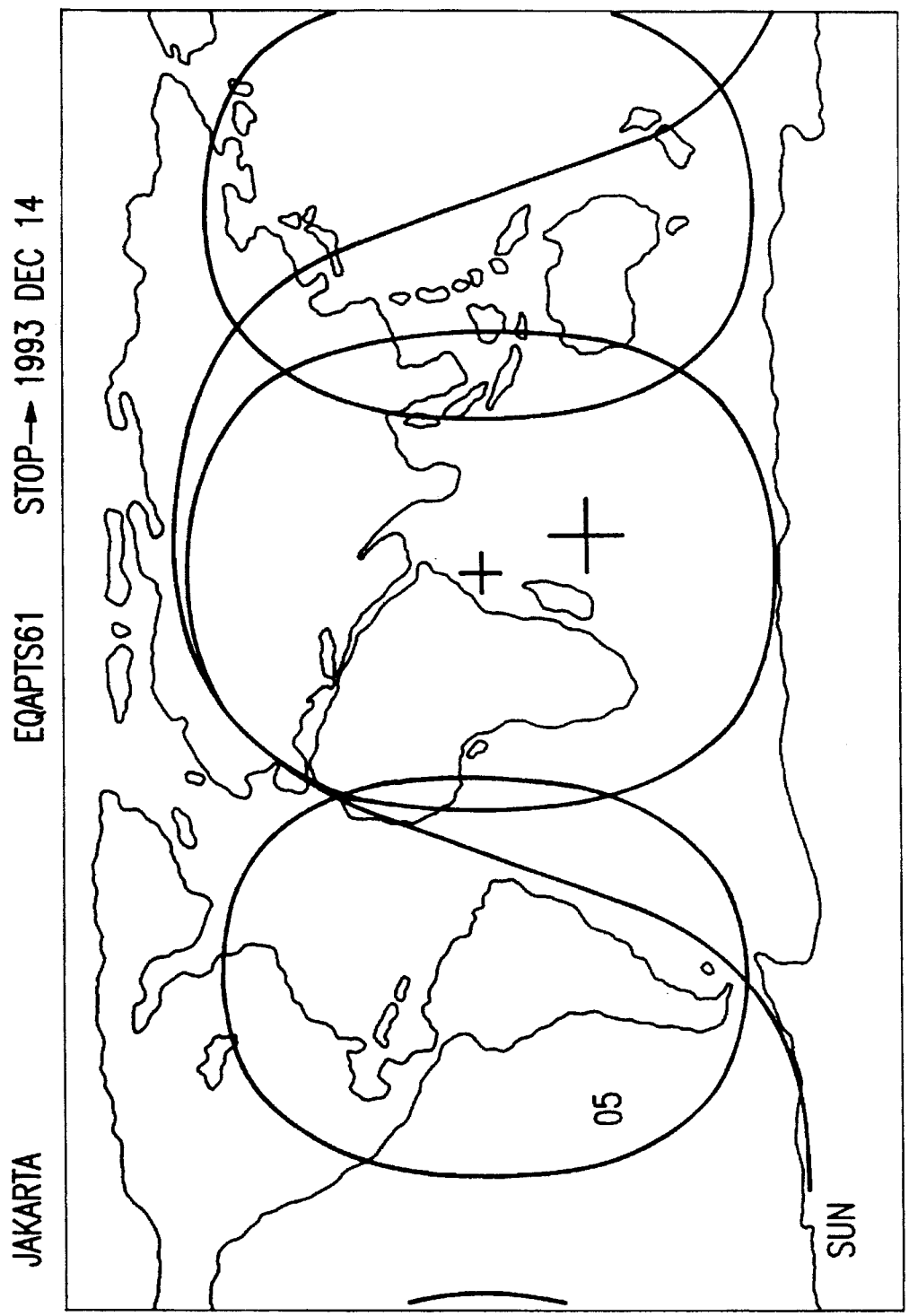
Figure 9C:
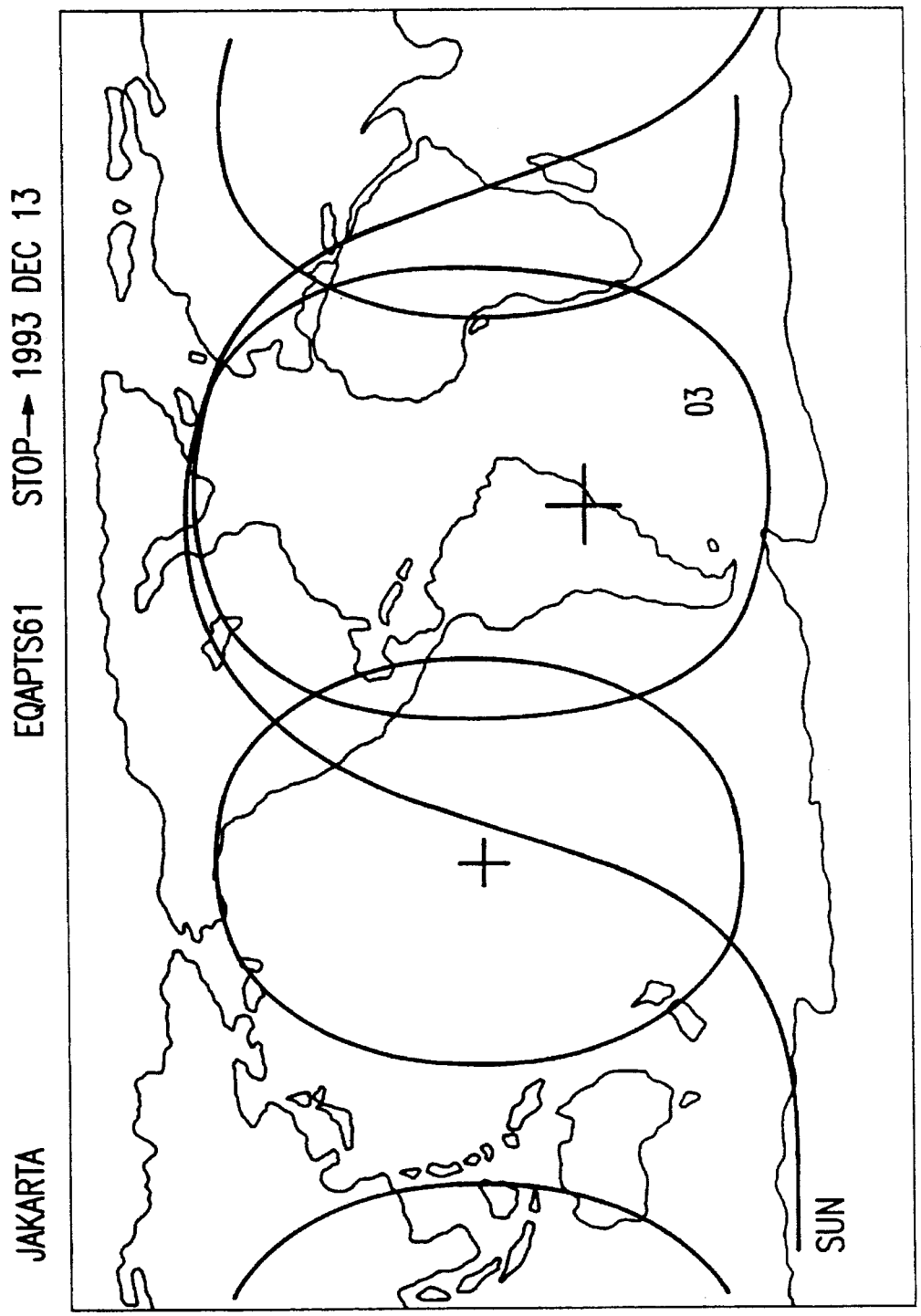

The fifth preferred orbit constrains the visibility angle to 0° and obtains continuous equatorial region daytime coverage with only three satellites. Again, there are gaps at nighttime, but none in the daylight hours. FIGS. 9A, 9B, and 9C show the various daylight hour coverages. FIG. 9A shows coverage at 1535 GMT, FIG. 9B shows coverage at 740 GMT, and FIG. 9C shows coverage at 1500 GMT.

Sixth preferred orbit configuration

Figure 10A:
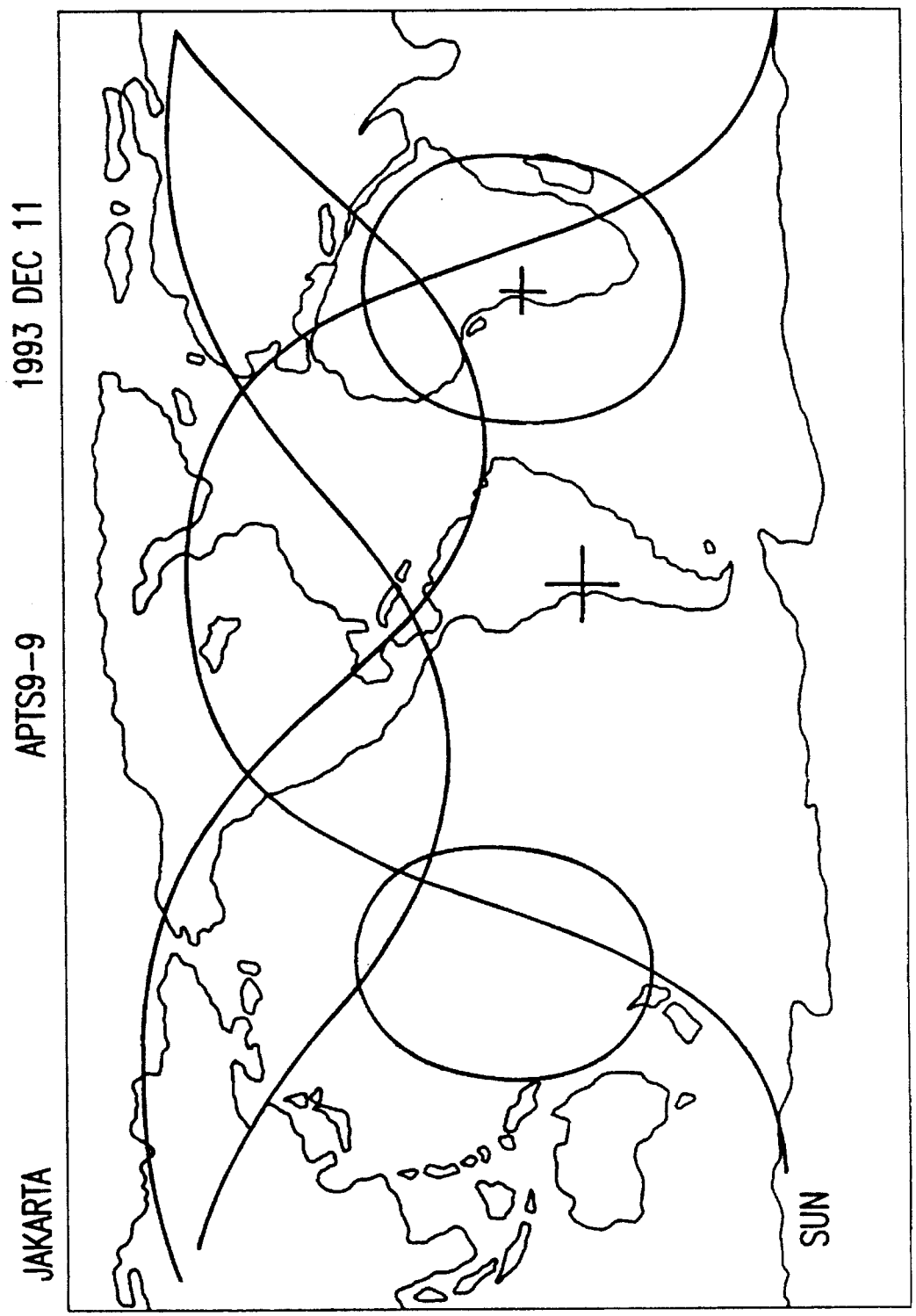
Figure 10B:
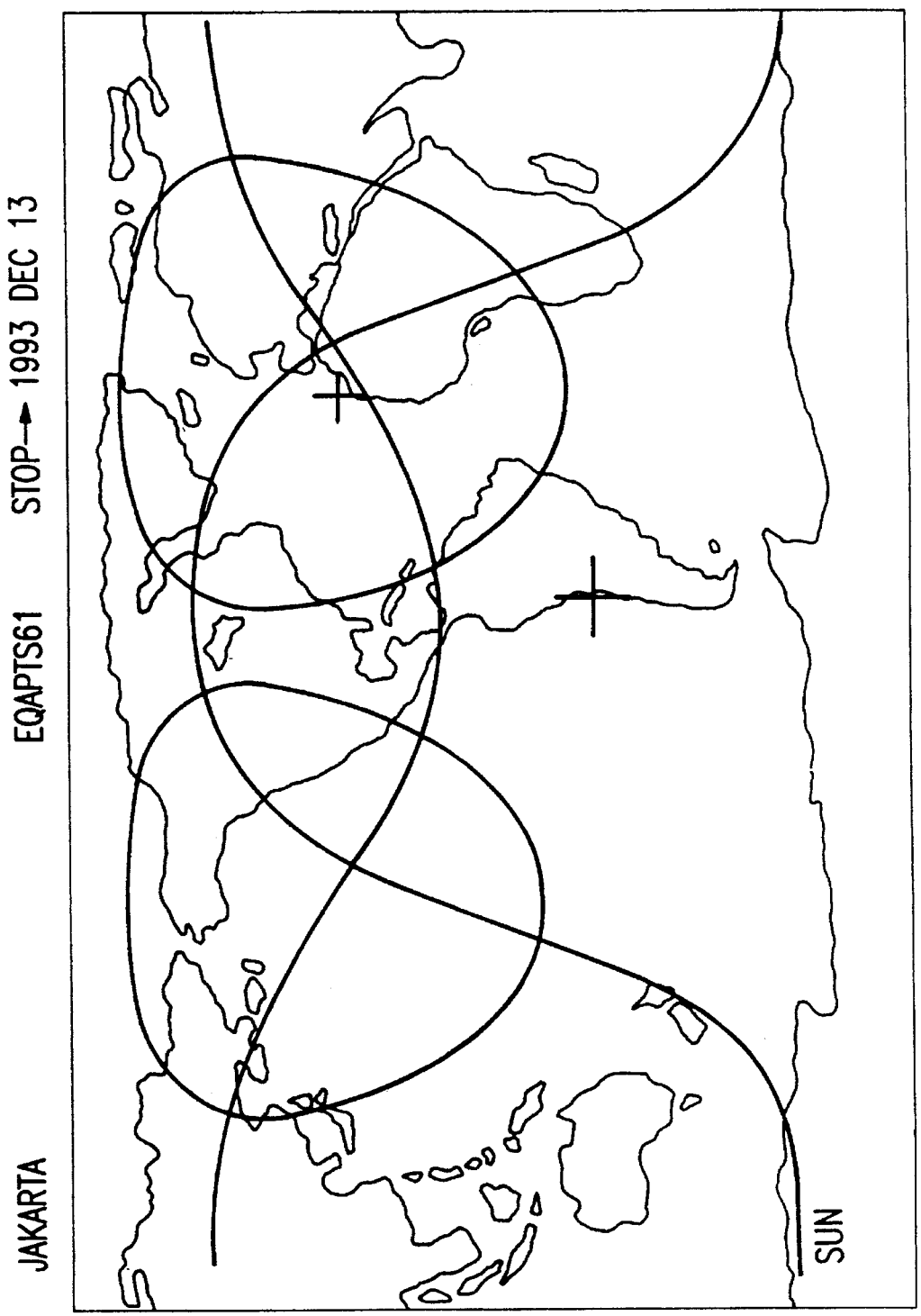

Finally, the sixth preferred mode is shown in FIGS. 10A and 10B. This four satellite array combines classic sun synchronism condition of $$\frac{d\Omega}{dt} = 0.9856$$

with the apogee on the sunward side of the earth. ω=262°. Apogee always occurs close to the meridian of the Earth at local apparent noon. This four satellite array provides continuous coverage of day lit areas north of 20° north latitude all year round in all countries. This sixth example has an afternoon ascending node, apogee at noon, a forced inclined plane, and a three hour period with the apogee equals about 4000 nautical miles.

Although only a few embodiments have been described in detail above, those having ordinary skill in the art will certainly understand that many modifications are possible in the preferred embodiment without departing from the teachings thereof.

All such modifications are intended to be encompassed within the following claims.

What is claimed is:

1. A communication system, comprising:
    a constellation of satellites in orbit around the earth, each defining an elliptical orbit which has orbital parameters to satisfy the equation $$\frac{d\omega}{dt} + \frac{d\Omega}{dt} = 0.9856 \quad (1)$$

, where $\Omega$ is the right ascension of an ascending node, and $\omega$ is an argument of perigee, and wherein each of said satellites in orbit asymmetrically covers one parameter of coverage more than another in a way which is constant at all positions of the earth relative to the sun, and
    a plurality of earth stations, each positioned on the earth, each including tracking equipment to track a motion of at least one of said satellites, and communication equipment to communicate with said at least one of said satellites.

2. A system as in claim 1, wherein said parameter of coverage is geographical location.

3. A system as in claim 2, wherein said elliptical orbit is retrograde.

4. A system as in claim 3, wherein said orbit is chosen such that $d\omega/dt$ approaches zero.

5. A system as in claim 4, wherein an inclination of said orbit is set to substantially 116°.

6. A system as in claim 4, wherein an inclination of said orbit is set to substantially 115° and 118°.

7. A system as in claim 1, wherein said parameter of coverage is time of day.

8. A system as in claim 7, wherein said elliptical orbit is prograde.

9. A system as in claim 8, wherein an apogee of the elliptical orbit is always at a constant angle from an earth-sun line: an inclination of the orbit is between 0 and 43 degrees, period is between 1.7 to 5.0 hours, and eccentricity is between 0.0002 to 0.56.

10. A system as in claim 8, wherein inclination is greater than 0.5°.

11. A system as in claim 8, wherein inclination is greater than 10°.

12. A system as in claim 8, wherein said orbit is inclined.

13. A system as in claim 1, having a period of three hours.

14. A system as in claim 1, wherein an ascending node of each of the satellites is either at noon or at midnight.

15. A system as in claim 1, wherein said constellation includes a first ring of satellites, each of which have noon ascending nodes, and a second ring of satellites, each of which have midnight ascending nodes.

16. A method of communicating with a satellite, comprising the steps of:
    propelling said satellite into an elliptical orbit which has orbital parameters to satisfy the equation $$\frac{d\omega}{dt} + \frac{d\Omega}{dt} = 0.9856 \quad (1)$$

, where $\Omega$ is the right ascension of an ascending node, and $\omega$ is an argument of perigee, and wherein said orbit has characteristics to asymmetrically cover one parameter of coverage more than another in a way which is constant relative to a position of the sun, all year round;
    providing a ground station which tracks a position in the orbit where the satellite will be at any given time; and
    communicating between the ground station and the satellite.

17. A method as in claim 16, wherein said parameter of coverage is a geographical location.

18. A method as in claim 16, wherein said propelling step propels said satellite into an elliptical retrograde orbit.

19. A method as in claim 18, wherein said orbit is chosen such that $d\omega/dt$ approaches zero.

20. A method as in claim 19, wherein said propelling step includes propelling said satellite into an orbit, an inclination of said orbit is set to substantially 116°.

21. A method as in claim 19, wherein said propelling step includes propelling said satellite into an orbit whose inclination of said orbit is set to substantially 115° and 118°.

22. A method as in claim 16, wherein said parameter of coverage is time of day.

23. A method as in claim 22, wherein said elliptical orbit is prograde.

24. A method as in claim 23, wherein the apogee is always at a constant angle from the earth-sun line: an inclination is between 0 and 43 degrees, period is between 1.7 to 5.0 hours, and eccentricity is between 0.0002 to 0.56.

25. A method as in claim 23, wherein said propelling step includes propelling said satellite into an orbit with an inclination that is greater than 0.5°.

26. A method as in claim 23, wherein said propelling step includes propelling said satellite into an orbit with an inclination that is greater than 10°.

27. A method as in claim 16, having a period of three hours.

28. A method as in claim 16, wherein said propelling step includes propelling said satellite into an inclined orbit.

29. A method as in claim 16 wherein an ascending node of each of the satellites is either at noon or at midnight.

30. A method as in claim 16, wherein there are a constellation of satellites which includes a first ring of satellites, each of which have noon ascending nodes, and a second ring of satellites, each of which have midnight ascending nodes.

\* \* \* \* \*